M. GRAETZ.
OUTSIDE LAMP FOR INVERTED INCANDESCENT GAS LIGHT.
APPLICATION FILED FEB. 4, 1910.
1,030,080. Patented June 18, 1912.
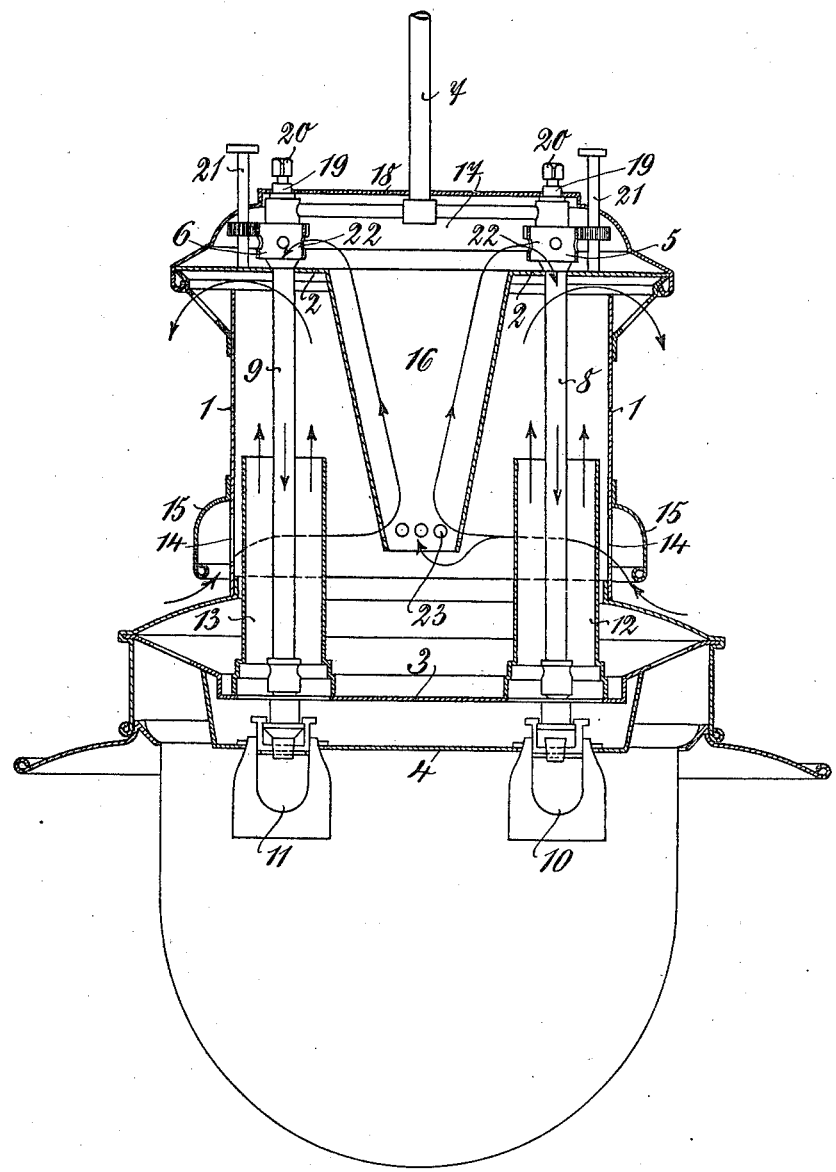
Witnesses:
Corinus Myers,
Thomas Donnellan.
Inventor:
Max Graetz.
by L. K. Böhm,
Attorney

UNITED STATES PATENT OFFICE.

MAX GRAETZ, OF BERLIN, GERMANY.

OUTSIDE LAMP FOR INVERTED INCANDESCENT GAS-LIGHT.

1,030,080. Specification of Letters Patent. Patented June 18, 1912.

Application filed February 4, 1910. Serial No. 542,096.

*To all whom it may concern:*

Be it known that I, MAX GRAETZ, a subject of the King of Prussia, resident of 92/93 Elsenstrasse, Berlin, German Empire, have invented a new and Improved Outside Lamp for Inverted Incandescent Gas-Lights, of which the following is a specification.

This invention relates to gas lamps, and more particularly to outside lamps for inverted incandescent gas-light.

It consists substantially in providing a special air-collecting chamber, from which the air to the Bunsen burner is drawn, which chamber being above the exit point for the waste gases, is supplied with air through a trunk which leads through the chimney of the lamp.

Moreover this invention contains several novel features, by which the disturbing of the lamp by influences of the atmosphere is minimized, and by which a steady burning of the lamp, even in case of unfavorable weather-conditions is assured and the economy of the lamp is increased.

This invention is illustrated in the accompanying drawing by way of example, the figure showing a vertical section through a lamp with two burners, having a common gas and air supply and a common chimney for the outlet of the waste gases.

The chimney casing 1 of the gas lamp is closed at its top end by a cover 2 and at its bottom end by the bottom plate 3, on which the reflector 4 is mounted. On the cover-plate 2 there is arranged an air-collecting chamber 17, in which the Bunsen-burners or suction chambers 5 and 6 of the burner tubes 8 and 9 are arranged. The gas is supplied by the pipe 7 to the nozzles 19, which are controlled by externally arranged screws 20 which screws pass outside the upper cover plate 18 of the air collecting chamber 17. The burner tubes 8 and 9 lead to the burner heads and mantles 10 and 11. The burnt gases from the mantles 10 and 11 pass upward through pipes 12 and 13, arranged above the mantles 10 and 11 and around the burner tubes 8 and 9. To the upper cover-plate 2 which also forms the bottom of the air collecting chamber 17, there is fixed a central conical pipe 16, which narrows downwardly, and is preferably provided with holes 23 near its lower end. The holes 23 and the lower end of the conical pipe 16 are arranged to open into the interior of the chimney casing, but below the free exit of the burnt gases from the pipes 12 and 13 into the upper part of the interior of the chimney casing. The air enters into the lower part of the chimney casing through openings or windows 14, which are protected against rain and other weather-influences by a hood 15. The waste gases, after their exit from the tubes, 12, 13, rise within the chimney casing and pass finally through openings, arranged below the air collecting chambers 17, the exit windows or openings being likewise protected by a suitable shelf or hood.

By providing the pipe 16 with a narrowed end-portion or with the holes 23, the air, which passes to the collecting chamber 17, is throttled within the passage, and thereby the burner tubes are not affected by strong wind currents. At the same time all ingress of burnt gases to the air chamber 17, and the mixing of the waste-gases with the fresh air-supply is prevented by arranging the openings 23 and the open end of the pipe 16 well out of the path of the burnt gases and below their exit from the tubes 12, 13. Nevertheless the heat of the waste gases is utilized as much as possible by the fact, that the fresh air first flows around the heated waste gas exit tubes, and that afterward the hot waste gases flow around the conical pipe 16 and under the bottom of the air collecting chamber 17. Further it will be seen that in my gas lamp those parts, which require frequent inspection and regulation are readily accessible. Thus the nozzle controls 20 may be readily adjusted without detaching any part of the lamp, and further the air control rings 22 for the suction chambers 5 and 6 are adapted to be adjusted by means of a spindle 21, carrying a toothed wheel engaging with suitable gearing on the said ring.

It will be understood that modifications may be made in the construction of the lamp according to the number of burners with which the lamp is fitted, and, moreover, the particular form of air collecting chamber 17 and central tube 16 may be varied without departing from the scope of the appended claims.

The principal features of my invention consist in constructing the lamp so that the air to the air-collecting chamber is drawn from a point out of the path of the burnt gases, and preferably within the lamp casing, and constructing this collecting chamber of considerable capacity, so as to avoid as far as possible the effect of heavy wind-currents. The provision of holes arranged near the bottom of the conical pipe has also proved of advantage, which advantage probably is due to the fact, that the air, which enters through the said holes, breaks the upward current of the other air coming from below, and thereby the air is caused to enter the collecting chamber steadily and quietly.

I claim:—

1. In an incandescent gas lamp the combination of a chimney casing, an air collecting chamber above said casing and from which the air for the burner is drawn, a transverse partition separating the interior of said air collecting chamber from the chimney a tube concentrically arranged in said casing and opening at its upper end through said partition into said air-chamber, and opening at its lower end direct into the lower part of the chimney, air inlets in the lower part of said chimney casing and means whereby the waste gases from the burner are conducted direct from the burner so as to exit into the upper part of the chimney above the lower end of said tube and so as to entirely surround the latter.

2. In an incandescent gas lamp the combination of a chimney casing, an air collecting chamber above said casing and from which the air for the burner is drawn, a frusto-conical tube centrally arranged in said casing and connected with said air chamber, said frusto-conical tube opening into the lower part of the chimney at a point below the exit of the waste gases from the burner into the chimney, and air inlets in the lower part of said chimney casing.

3. In an incandescent gas lamp the combination of a chimney casing, an air collecting chamber above said casing and from which the air for the burner is drawn, a tube centrally arranged in said casing and connected with said air chamber, said tube increasing in diameter toward its upper end and opening into the lower part of the chimney at a point below the exit of the waste gases from the burner into the chimney and air inlets in the lower part of the said chimney casing.

4. In an incandescent gas lamp, the combination of a chimney casing, an air collecting chamber above said casing and from which the air for the burner is drawn, a tube centrally arranged in said casing and connected with said air chamber, said tube opening into the lower part of the chimney at a point below the exit of the waste gases from the burner into the chimney, air inlets in the lower part of said chimney casing and a tube surrounding the burner tube for conducting the hot gases from the burner to the upper part of the chimney.

5. In an incandescent gas lamp, the combination of a chimney casing which is closed at its upper and lower ends; an air collecting chamber from which the air for the burners is drawn, and which chamber is arranged above the chimney casing; a plurality of waste gas conducting tubes, connecting the part below the lower cover of the chimney casing to the upper part within the chimney casing, said upper part of the chimney casing having a direct connection to the outer atmosphere; and a centrally arranged frusto-conical tube, connecting the air collecting chamber to the lower part within the chimney casing below the upper end of the waste gas conducting tubes, said lower part of the chimney casing having likewise a direct connection with the outer atmosphere and said centrally arranged tube being narrower at its lower part.

6. In an incandescent gas lamp, the combination of a chimney casing which is closed at its upper and lower ends; an air collecting chamber from which the air for the burners is drawn, and which chamber is arranged above the chimney casing; a plurality of waste gas conducting tubes surrounding the burner tubes and connecting the part below the lower cover of the chimney casing to the upper part within the chimney casing, said upper part of the chimney casing having a direct connection to the outer atmosphere; and a centrally arranged frusto-conical tube, connecting the air collecting chamber to the lower part within the chimney casing below the upper end of the waste gas conducting tubes, said lower part of the chimney casing having likewise a direct connection with the outer atmosphere, and said centrally arranged tube being narrower at its lower part.

7. In an incandescent gas lamp, the combination of a chimney casing, an air collecting chamber above said casing and from which the air for the burner is drawn, a tube centrally arranged in said casing and connected with said air chamber, said tube opening into the lower part of the chimney at a point below the exit of the waste gases from the burner into the chimney, air inlets in the lower part of said chimney casing and means for regulating the supply of air to the burner tube.

In witness whereof I have hereunto set my hand in the presence of two witnesses.

MAX GRAETZ.

Witnesses:
 HENRY HASPER,
 WOLDEMAR HAUPT.